May 15, 1962 R. A. FANTI ETAL 3,034,762
BLADE DAMPING MEANS
Filed May 31, 1960 2 Sheets-Sheet 1

INVENTORS
FRANKLIN O. CARTA
ROY A. FANTI
BY
ATTORNEY

May 15, 1962   R. A. FANTI ETAL   3,034,762
BLADE DAMPING MEANS

Filed May 31, 1960   2 Sheets-Sheet 2

INVENTORS
FRANKLIN O. CARTA
ROY A. FANTI
BY Leonard F. Wakliud
ATTORNEY

# United States Patent Office 3,034,762
Patented May 15, 1962

3,034,762
BLADE DAMPING MEANS
Roy A. Fanti, Springfield, Mass., and Franklin O. Carta, Williamsville, N.Y., assignors to United Aircraft Corporation, East Hartford, Conn., a corporation of Delaware
Filed May 31, 1960, Ser. No. 32,764
9 Claims. (Cl. 253—77)

This invention relates to turbomachinery and in particular to axial flow compressors and the like having means for delaying or avoiding acoustical resonance in the blading.

Compressor blade failures are frequently attributed to aerodynamic or mechanical excitations (e.g., inlet velocity distortions, blade wakes, dynamic unbalance, etc.) which have a forcing frequency equal to the natural bending frequency of the blading. In each of these cases there is a distinct phase relationship between the motion of a given blade and the motion of adjacent blades. The angle by which the motion of a given blade leads the motion of the adjacent airfoil below it (i.e., the adjacent airfoil in the direction of rotation) is defined as the interblade phase angle. In both analytical and experimental studies it has been shown that if the absolute value of the interblade phase angle is near 0° or 360° (adjacent blades nearly in phase) the aerodynamic damping in bending will have a minimum value and hence the resonant bending response to an externally applied excitation will be a maximum. Furthermore, at these values of the interblade phase angle a condition of acoustical resonance (in which the aerodynamic damping is theoretically zero) will be encountered at a minimum value of the Mach number. It has also been shown that if the interblade phase angle is near 180° the aerodynamic damping in bending will have a maximum value and hence the resonant bending response to an externally applied excitation will be a minimum. At this phase angle the condition of acoustical resonance will be encountered at a maximum value of the Mach number. It has also been found that for configurations presently in use, with all the blades free to oscillate at the same frequency, the interblade phase angle at which the blades oscillate in response to these external excitations is generally near 360°.

It is an object of this invention to provide a particular blade constraint to thereby maximize the aerodynamic damping in bending and minimize the resonant bending response to external excitations of compressor blades.

It is another object of this invention to provide blade arrangements which are based on the premise that the aerodynamic interactions of a cascade of air foils oscillating 180° out of phase can be closely approximated by a cascade in which alternate airfoils are oscillating in phase with one another and the intermediate foils are stationary.

It is a primary object of this invention to provide an axial flow rotor having circumferentially distributed blades with the outer ends of the alternate blades being interconnected or restrained against motion with the intermediate blades having their outer ends relatively free.

These and other objectives will become readily apparent from the following detailed description of the drawings in which.

Figure 1:
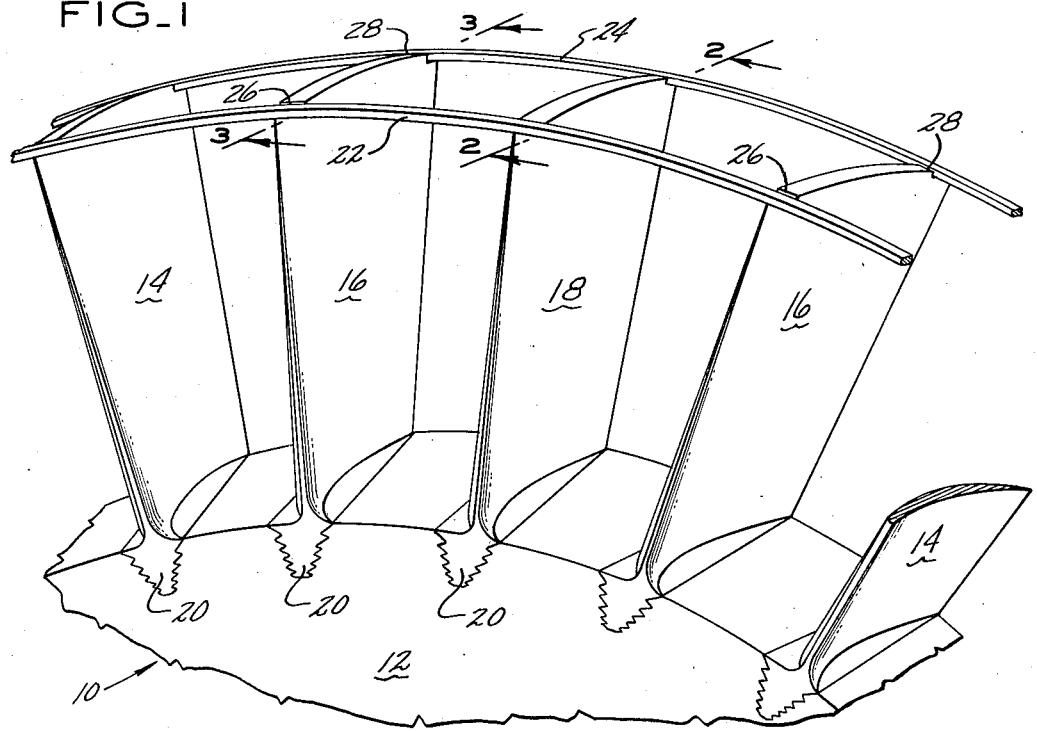
FIG. 1 is a partial perspective of a cascade of blades such as a compressor rotor.
Figure 2:
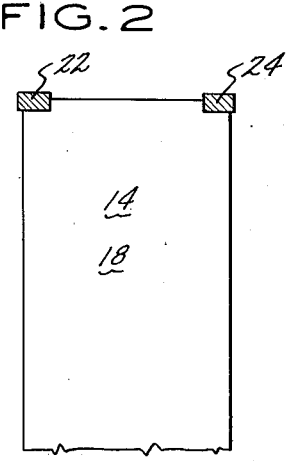
FIG. 2 is a section taken substantially along the line 2—2 of FIG. 1.
Figure 3:
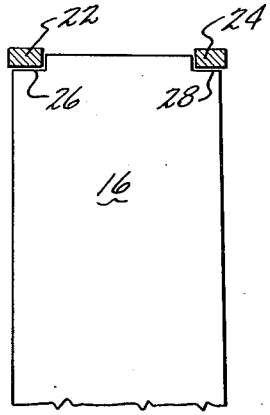
FIG. 3 is a section taken substantially along the line 3—3 of FIG. 1.

Referring to FIG. 1, a typical axial flow rotor is generally indicated at 10 as having a hub 12 which in turn supports a plurality of blades, as for example, 14, 16, and 18. The blades may be mounted in the rotor by a typical fir-tree arrangement 20 or the mountings may be of the well-known pin type. Hoops or rings 22 and 24 are provided adjacent the outer ends of the blades, with the hoops being fixed or welded to alternate blades 14 and 18. These weld arrangements may be of the type shown in FIG. 2.

The intermediate blades, such as 16, include cutouts 26 and 28, which are spaced from and free of the rings 22 and 24. As a result, the outer ends of the blades 14 and 18 will be connected to each other so as to prevent any relative bending movement therebetween, but the intermediate blade 16 will have its outer end substantially free for relative bending movement with respect to the adjacent blades 14 and 18.

Figure 4:
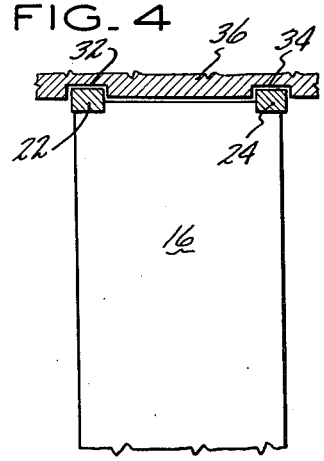
FIG. 4 is a modified form of constraint of the general type shown in FIG. 2.

The outer circumferential rings or hoops 22 and 24 may be free for their movement with respect to the outer casing as shown in FIG. 4. These rings may fit into grooves 32 and 34 in the outer casing 36 to limit the lateral freedom thereof.

Figure 5:
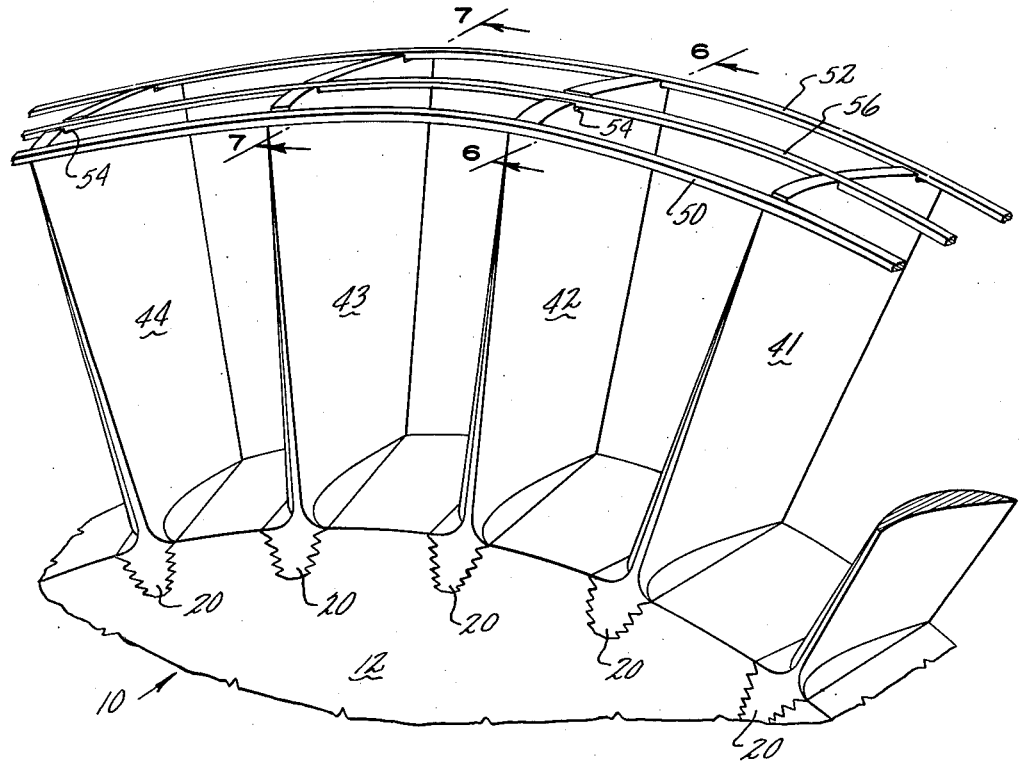
FIG. 5 is a partial perspective of a modified blade tip constraint arrangement.
Figure 6:
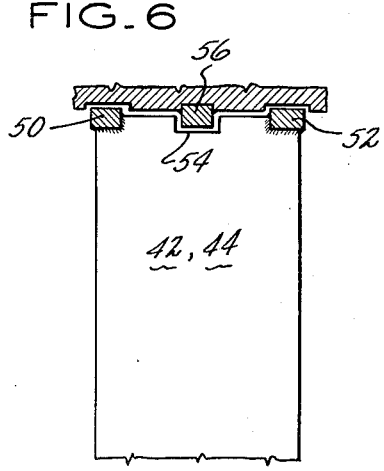
FIG. 6 is a cross section taken substantially along the line 6—6 of FIG. 5.
Figure 7:
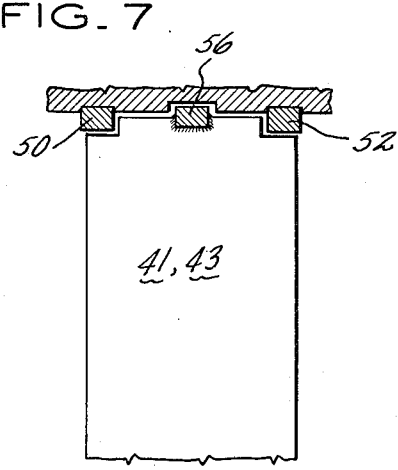
FIG. 7 is a cross section taken substantially along the line 7—7 of FIG. 5.

FIG. 5 illustrates a modification of the FIG. 1 construction in which alternate blades are connected to each other, and intermediate blades are in turn connected to each other. Thus, for example, as seen in FIG. 5, the blades 42 and 44 are connected at their outer tips to the hoops or rings 50 and 52. These are most clearly shown in FIG. 6. Each of the blades 42 and 44 include cutouts or notches 54 adjacent their outer ends so that they are free of an intermediate ring 56, which in turn is fixed or welded to the intermediate blades 41 and 43, as best seen in FIG. 7. In this manner every other blade is connected together at its outer tip.

As a result of this invention, a greatly improved damping arrangement has been provided for turbomachinery, particularly of the airfoil type which extends the Mach number range over which compressors can operate before encountering the acoustical resonance phenomenon. In addition, the means for obtaining this improved result is very simple and lends itself to present day compressor constructions.

Although several embodiments of this invention have been illustrated and described, it will be apparent that various changes may be made in the construction and arrangement of the various parts without departing from the scope of this novel concept.

What it is desired by Letters Patent is:

1. A turbomachine comprising a rotor, a plurality of blades circumferentially disposed about the periphery of said rotor, each of said blades extending radially from said rotor, means for mounting said blades at their root ends to said rotor, and means for restraining alternate blades against relative movement adjacent the tips thereof, the intermediate blades being mounted for relative freedom of movement of the tips thereof with respect to said alternate blades.

2. A turbomachine as in claim 1, wherein said intermediate blades have their tip regions interconnected.

3. A turbomachine according to claim 1, in which a continuous hoop interconnects said alternate blades.

4. A turbomachine according to claim 3, in which a surrounding casing is provided for said rotor and including means restraining lateral motion of said hoop.

5. A turbomachine comprising a rotor, a plurality of blades circumferentially disposed about the periphery of said rotor, each of said blades extending radially from said rotor and having substantially the same span, means for mounting said blades at their root ends to said rotor, and means for restraining alternate blades against relative movement adjacent the tips thereof, the intermediate blades being mounted for relative freedom of movement of the tips thereof with respect to said alternate blades.

6. A turbomachine according to claim 5, wherein a first-hoop means interconnects said alternate blades, and a second-hoop means interconnects said intermediate blades.

7. A turbomachine according to claim 6, wherein means is provided for restraining one of said hoop means against motion outside the plane of rotation of said rotor.

8. A turbomachine comprising a rotor, a plurality of blades circumferentially disposed about the periphery of said rotor, each of said blades extending radially from said rotor, means for mounting said blades at their root ends to said rotor, and means for restraining alternate blades against relative bending movement along the span thereof, the intermediate blades being mounted for relative freedom of bending movement with respect to said alternate blades.

9. A turbomachine as in claim 8, wherein said alternate blades are interconnected at points along their spans outboard of their root ends and said intermediate blades are relatively free for bending movement along their spans outboard of their root ends.

References Cited in the file of this patent

UNITED STATES PATENTS

| | | |
|---|---|---|
| 2,772,854 | Anxionnaz | Dec. 4, 1956 |
| 2,952,442 | Warnken | Sept. 13, 1960 |

FOREIGN PATENTS

| | | |
|---|---|---|
| 708,836 | Great Britain | May 12, 1954 |
| 732,622 | Great Britain | June 29, 1955 |
| 797,488 | Great Britain | July 2, 1958 |